United States Patent [19]
Erlandson

[11] Patent Number: 6,025,775
[45] Date of Patent: Feb. 15, 2000

[54] DRIVING-SAFETY ANCILLARY WHITE-FLASH ALERTING-SYSTEM

[76] Inventor: Glenn E. Erlandson, 9790 Silva Rd., El Cajon, Calif. 92021

[21] Appl. No.: 08/882,932

[22] Filed: Jun. 26, 1997

[51] Int. Cl.[7] .................................................. B60Q 1/00
[52] U.S. Cl. ......................... 340/436; 340/479; 340/475; 340/471
[58] Field of Search ................... 340/436, 479, 340/475, 471, 478, 465, 469, 456, 467

[56] References Cited

U.S. PATENT DOCUMENTS

| | | | |
|---|---|---|---|
| 5,172,095 | 12/1992 | Scott | 340/479 |
| 5,212,468 | 5/1993 | Adell | 340/469 |
| 5,481,243 | 1/1996 | Lurie et al. | 340/479 |
| 5,610,578 | 3/1997 | Gilmore | 340/479 |
| 5,631,627 | 5/1997 | Chou | 340/479 |
| 5,712,617 | 1/1998 | Quan | 340/468 |

OTHER PUBLICATIONS

PTO/Disclosure–document #353,042 . . . Filed: Apr. 25, 1994.
PTO/Disclosure–document #376,164 . . . Filed: May 11, 1995.

*Primary Examiner*—Jeffery A. Hofsass
*Assistant Examiner*—Anh La
*Attorney, Agent, or Firm*—Inventech/USA

[57] ABSTRACT

The notion of an easily retrofitable passive lighting-safety device designed to be generally installed into the existing rear lighting wiring-circuit of any motor-vehicle from motorcycles to cars and trucks, —so as to significantly boost a following driver's visualacuity cognition threshold of awareness regarding the state of a leading vehicle's sudden breaking procedure. The invention provides an intense quasi-precognitive white-light "flashback" alerting effect, preferably appearing (particularly under nighttime conditions) as a nearly subliminal approximate 100–200/ millisecond flashback of visually non-deacclimating "white-light", emanating from a vehicle's existing back-up lights (or integrated with the DOT high-center brake-light). The effect being to essentially arouse a following motorist's attention to the simultaneous light-up of the preceding vehicle's stoplights. Regardless as to how long braking action continues, the so called STOPWHITES™ only illuminate in flashback once for a brief instant per actuation of the brakes; —having served their sole purpose in attracting a following driver's attention to need for braking. A following driver being thus able to react substantially sooner than viewing conventional stoplights only; —thereby significantly shortening the braking response-time. Additionally, exemplary circuits teach wiring the preferably solid-state electrical-module with directional-signal lights, as well as the 4-Way/Emergency-flasher system.

22 Claims, 4 Drawing Sheets

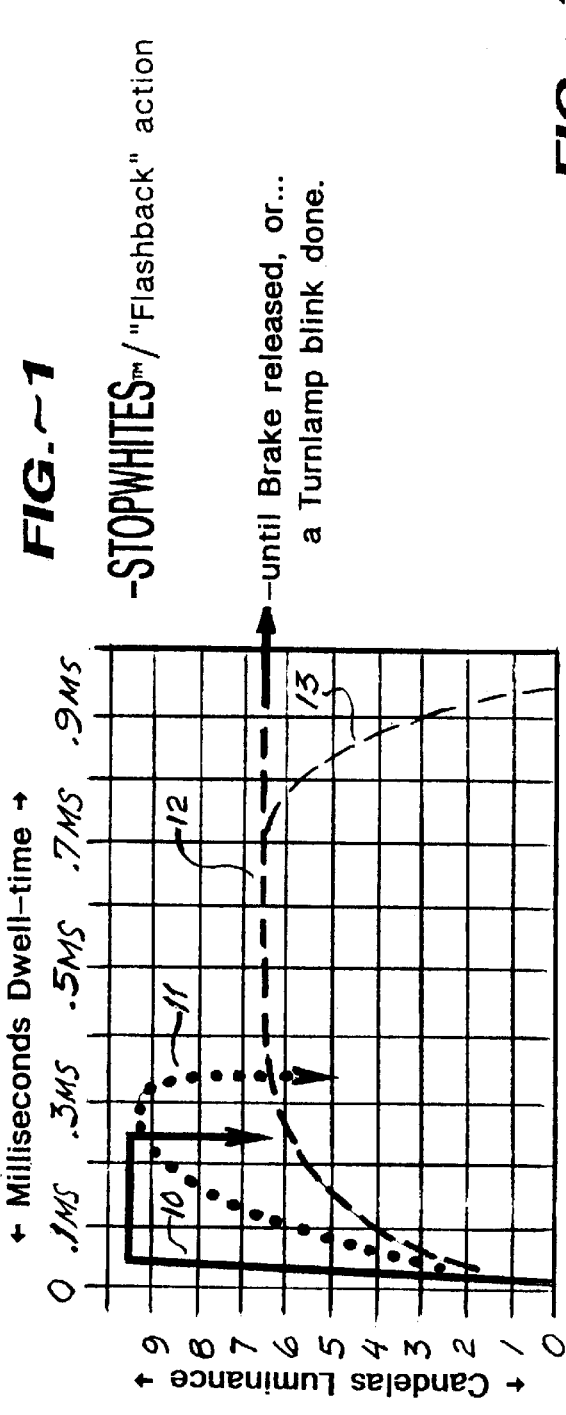
FIG.~1
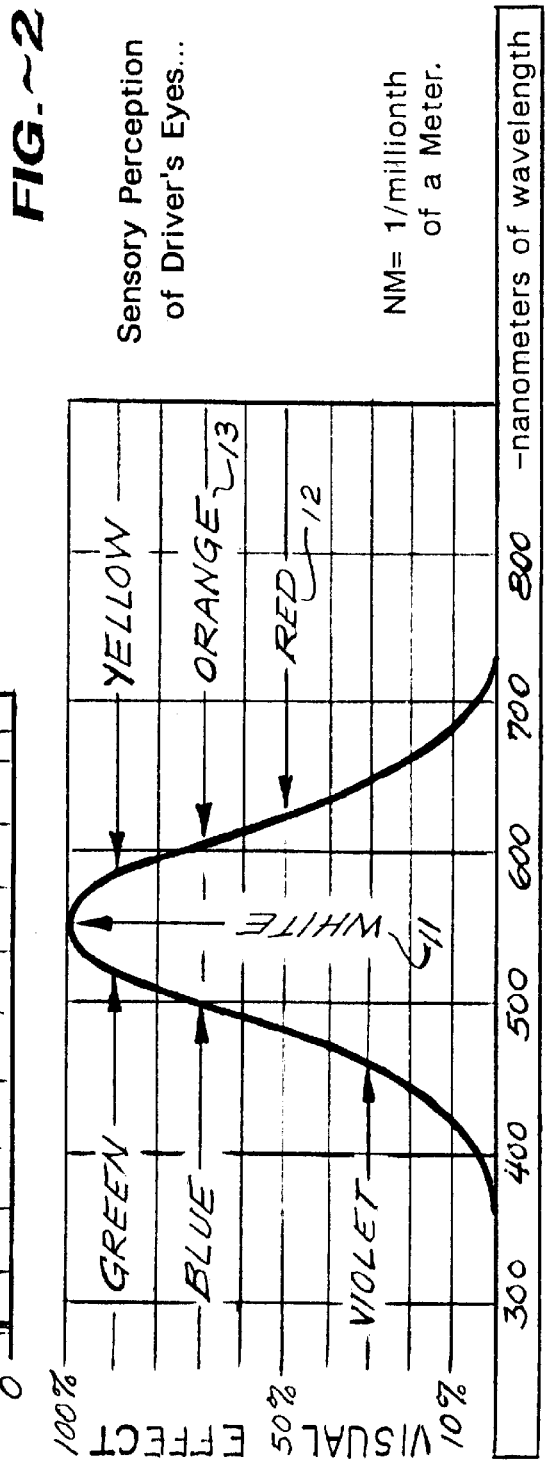
FIG.~2

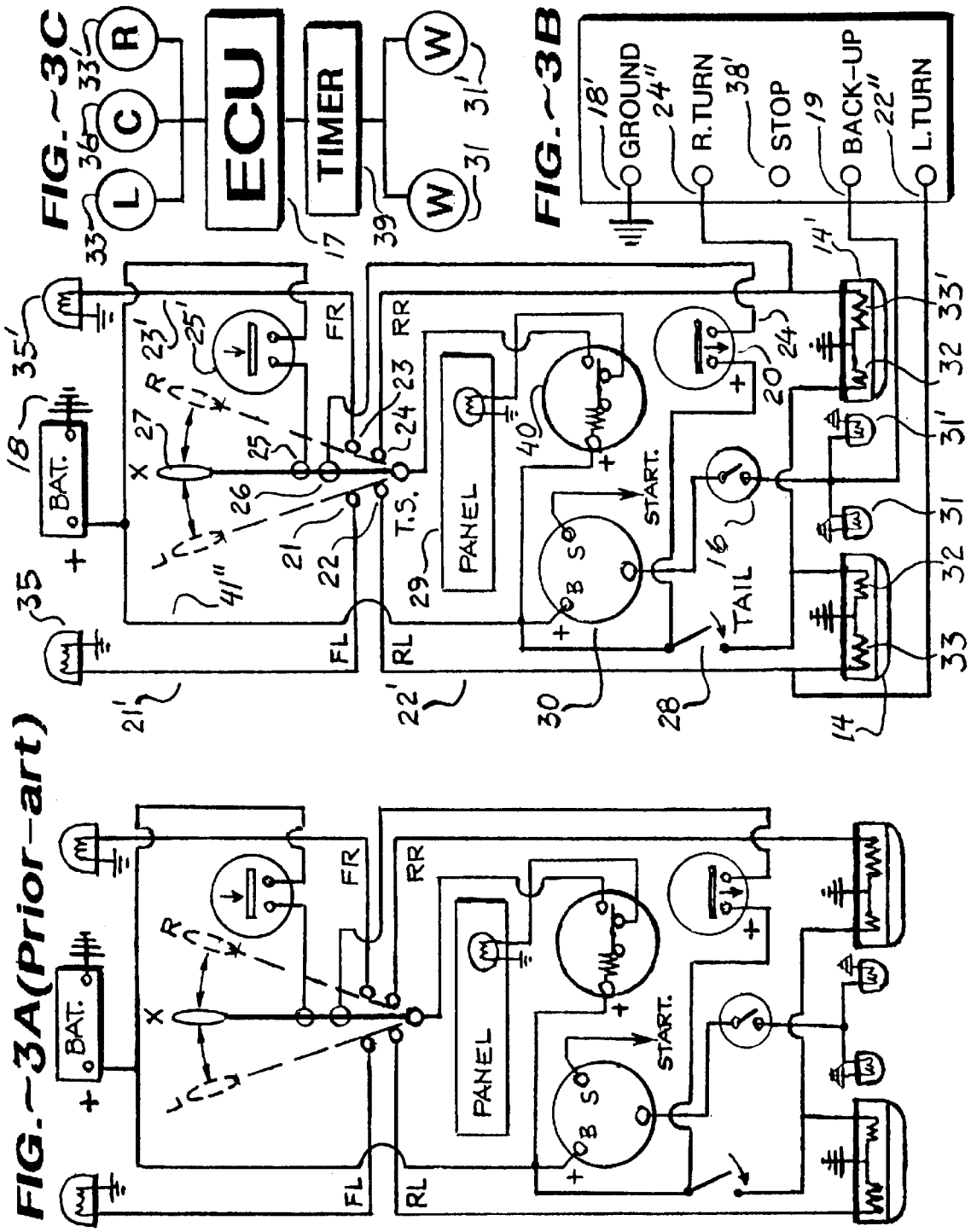

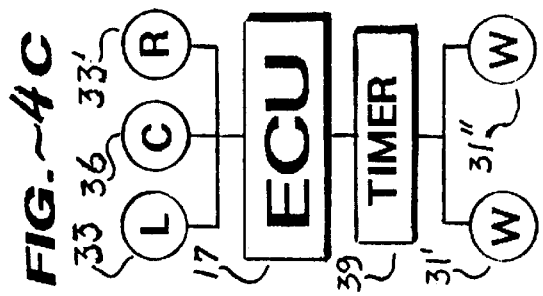
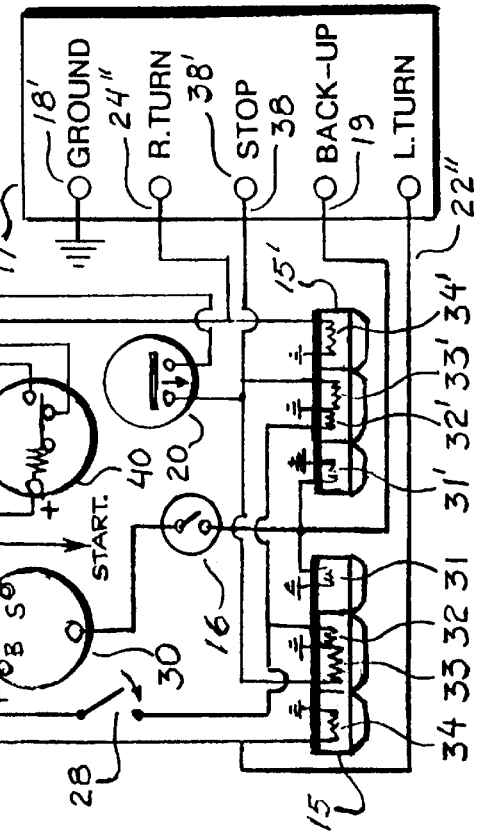
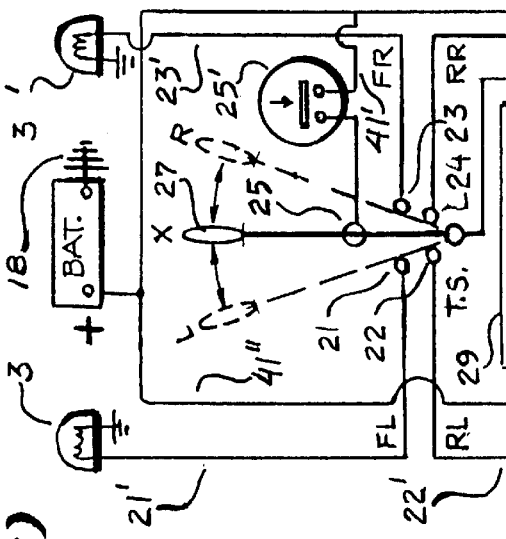

DRIVING-SAFETY ANCILLARY WHITE-FLASH ALERTING-SYSTEM

I.) PROBLEMATICAL BACKGROUND OF RELEVANT EARLIER INVENTION

This invention relates particularly to visual alert lighting devices activated by braking or signaling directional change of a vehicle, and more specifically it relates to types of vehicular rear lighting devices capable of emitting an initial intense flash of non-colored light, alerting following drivers as to ensuing alteration of the preceding vehicle's movement.

Heretofore, it has been the practice for some innovators of automotive stoplight activation alerting apparatus to employ special G-force or inertia sensative switches, (or possibly engine—vacuum sensing switching devices), —sometimes in combination with multi-sequential lighting colorations indicative of the degree of braking force. While this invention disclosure could be made to operate in combination with such devices, it is determined that the novel stoplight and turnlight related invention hereof simply functions best in combination with mere initial touch of the brake-pedal (or upon actuation of directional-signal), so as to thereby desirably react like a brief flash-of-lightening, necessarily (from a practical standpoint) prior to any possible reliance upon the physics of inertia coming into reactionary play.

Background research discovery provides some prior patent-art regarded as more germane to this disclosure, chronologically for example U.S. Pat. No. 3,708,782(filed: June 1970) shows an "abrupt brake application indicator" which involves a special brake-pedal sensory-switch to detect light application of the foot, plus a second-switch closes with movement of the pedal (or via elevation of hydraulic line pressure). Activation of the first-switch commences to charge a capacitor through a resistor, which if followed quickly by closing of the second-switch can induce a momentary increased brightness of the red-stoplights; while slower operation of the brake-pedal results only in normal intensity of the stoplights.

In U.S. Pat. No. 4,575,782(filed: June 1985 to G.A.S.-Inc.) shows a "collision avoidance light" of the sort federally mandated (for passenger-cars produced after August 1985) as a centrally elevated CYCLOPS® stoplight, the notion of which was employed as original-equipment on some vehicles of the 1940's. However, this invention-art deals specifically with the object of providing a lamp configuration which is staged within the vehicle interior and against the rear-window, yet which does not propagate glare forward toward the rearview-mirror into the braking driver's eyes. It is presently available as an aftermarket retail product as well as OEM.

In U.S. Pat. No. 4,651,129(filed: May 1985) shows the so-called "BAK-OFF™" auxiliary safety-stoplight apparatus, mounting centrally in the rear-window of the motor-vehicle. The housing is comprised of three discrete lighting compartments; a center stoplight, plus right and left lights thereto which blink alternately when the center light comes on, but then illuminate steady after a predetermined number of blinks. There is no association with the back-up light system.

In U.S. Pat. No. 4,987,405(filed: June 1990) shows an "elevated brake-light signal module". The invention intended only to induce a predetermined duration (1–4 seconds) of normal blinking action, after which this third red stoplight illuminates steady, then blinks again, etc., —until release of the brake-pedal. There is employment of the backup-light circuit only to facilitate steady blinking of the third stoplight when vehicle is placed in reverse.

In U.S. Pat. No. 5,109,214(filed: February 1990) shows a lane-changing signal built-in to an outside rearview-mirror, wherein also included is a circuit whereby upon placing the transmission in reverse, conventional automatic closing of the existing backup-light switch also activates the full array of existing front/rear signaling-lamps as well as the special RV-mirror signaling-lamp units. Circuitry diagrams indicate no actuation of the backup-lights in conjunction with operation of the brake-pedal is contemplated.

In U.S. Pat. No. 5,111,181(filed: August 1989) shows an inertial-switch FIG. 1 by which a variable capacity electrical signal may be provided to vary the intensity of a vehicle's stoplight. Circuitry diagrams indicate no actuation of the backup-lights in conjunction with operation of the brake-pedal is contemplated.

In U.S. Pat. No. 5,111,182(filed: April 1990) shows a "vehicle braking-action alerting apparatus", wherein is included an oscillator which is timed to function from several tens to several hundreds of milliseconds and to thereby cycle the existing stoplights many times during that interval of time. However, the system is dependent upon a slave-sensor system being activated in the following vehicle, to actuate a dash-lamp or audio-transducer within the following vehicle, thereby notifying the driver of brake actuation by the preceding vehicle.

In U.S. Pat. No. 5,150,098(filed: November 1990) shows a special rear-window stationed multi-stage lighting-apparatus, which is somewhat exemplary of vehicle safety-lamps wherein the greater the degree of breaking effort, the greater number of lamps may be transversely actuated, some examples featuring employment of variously hued segments. However, there is no contemplation of the use of so-called white-light, such as is typically emanated from a vehicle's existing back-up lamps.

In U.S. Pat. No. 5,148,147(filed: December 1990) shows a brake-lighting system by which a following motorist can be visually notified via amber-light as to deceleration, and via red-light as to braking. Whereby at lower speeds a longer-flash is shown, at higher-speeds a shorter-flash is shown (also according to what transmission-gear the car is in); —which is demonstrative of a rather non-passive system, expecting (perhaps over presumptively) a following driver analyze as to just what is being visually-telegraphed by way of special lighting information.

In U.S. Pat. No. 5,231,373(filed: June 1991) shows an exemplary Hall-effect pendulum type inertial-switch means, for automatically modulating the intensity of the vehicle's existing stoplights according to the degree of braking effort. Again, there is no contemplation of the use of so-called white-light, such as is typically emanated from a vehicle's existing back-up lamps.

During just the first 4-months of 1996, the cost of motor-vehicle collisions was some $50.2-billion; —an approximate 10%-increase from that period a year prior! Some 17,600,000-motorists were involved in car accidents during the year; and of those, some 6,300 were injured daily, of which 120 died daily! —It is calculated that implementating the invention of this disclosure could have helped save a life every hour, every day!

Therefore, in full consideration of the preceding patent review, there is determined a need for an improved form of device to which these patents have been largely addressed. The instant inventor hereof (author of "How to Win at Handicap Drag-racing"), became aware of the critical importance of timing of lights owing to his background as two-time "American HotRod Association" Stock/Drag-racing-champion. This Inventor believes his newly improved braking-alert device, commercially referred to as "STOPWHITES™" (StopWhites or Stop-whites), currently being developed for production under auspices of the Erlandson-Mfg./Mkt.Co., —exhibits certain vital safety advantages as shall be revealed in the subsequent portion of this instant disclosure.

II.) SUMMARY OF THE INVENTION

A.) In view of the foregoing discussion about the earlier invention art, it is therefore important to make it pellucid to others interested in the art that an object of this invention is to provide a special "flashback" safety stoplight system, devised to give the driver of a following vehicle near subliminal advance or alerting notice as to activation of the stoplights of the proceeding vehicle. Motor-vehicle insurance industry records reveal many serious rear-end collisions impacting automobiles, motorhomes, trucks, buses, and motorcycles, are often the result of a following-vehicle driver becoming essentially lulled into a mesmerized state of awareness, tending to be somewhat oblivious to a proceeding vehicle's braking activity. Or, in still another instance, the driver of the following-vehicle may unwittingly find their attention distracted by some other activity(to the rear, side, or within the vehicle interior such as during use of a cellular-phone), which has momentarily captured their "mind's-eye" of attention. The problem with diverted attention while driving in a forwardly direction being, that in but a split-second, events can occur culminating in a tragic traffic-accident, that can adversely alter or abruptly end one's life! Even for example, the simple effect of glare from the sun during different times of the day involving a certain direction of travel, can cause a "washout" effect to the red brake-lights of a preceding stopping vehicle. A major braking-systems company recently stated—"if braking could occur 1-second earlier, it would prevent 90% of all rear-end collisions".

Owing to a reactivation-suppression delay-phase of operation preferably built-in to my STOPWHITES™ ECU (electronic control unit), regardless as to how long the braking action continues, the so called STOPWHITES™ illuminate in flashback preferably only once for but an instant per normal application of the brake-pedal; —having served their sole novel purpose in "attracting" the following driver's attention to need for braking. In a vehicle traveling at 30 mph(45 ft/per sec.) for example, a following driver is thus shown able to react approximately ¼-second sooner than with the aid of conventional stoplights only; —thereby significantly shortening the braking response-time by some 10-feet. An optional variation of this flashback function, has the dwell-time for the STOPWHITES™ extended in duration at stop-and-go speeds (approx. 0–15 mph), and decreased in duration at highway-speeds; as the tailoring of flashback dwell-time in response to the monitoring of vehicle speed results in improved overall intelligibility. Hence, an optional inverse correlation of dwell-time to vehicle-speed, is believed an enhancing characteristic.

At the same time, it is implicit to understand that at no time does my special STOPWHITES™/flashback-system produce sufficient on/dwell-time as to pose a problem with nightime visual aquity. That is to technically say, that the on/dwell-time (which prevails only in milliseconds) is preferably of insufficient duration as to cause the pupil-iris of the human-eye to close-down significantly (such as is actually momentarily caused by the intensity of a vehicle approaching with high-beams on) from it's usual desirably wide-open nightime light-gathering opening condition. Accordingly, it is therefore regarded that this brief on/dwell-time characteristic of the invention disclosure does not therefore technically constitute an actual functional-"on" glare causing condition, as the various state DMV(Dept.Motor Vehicles) code-books define the term "on" (DMV-regulations stating in effect, that: —vehicle back-up lamps are never to be "on" while driving forward, owing to the resulting detrimental night-blinding tendency). In as much as the STOPWHITES™ flashback-system "on"/dwell-time is so minuscule, it's blink-of-an-eye "on"-time is found to be insufficient to be "measurably deleterious" to safe night-vision acclimatization, or momentary loss of visual-acuity.

It should be further considered that DOT has issued approval(DOT-code: 571/S5.7) of a high-intensity candy-cane like "white & red" retro-reflective diamond/cross-hatched so-called "conspicuous-system" tape made by 3M-corporation; —claimed to provide significant anti-collision protection for the rear of big-rig truck-trailers. The retroefficiency of the white portion of this tape-material being so intense (at least 1,290-millicandeles/lux, as compared to 310-millicandeles/lux for the adjacent red of the same surface-area), as to send back to a following driver's eyes nearly as much constant candle-power luminance as is being emitted from the steady glare of the observing vehicle's own headlights.

B.) Another object of this invention disclosure is to set forth a special "flashback" safety stoplight system, wherein the regular back-up lights (usually pre-existing, as Federally DOT(Dept.Of Transportation)-mandated since circa 1969), which are generally arranged variously as two transversely spaced-apart(relative to the longitudinal center-line of the vehicle) units at the right/left rear-end of motorcars, motorhomes, trucks, etc., are electrically adapted to cooperate with the similarly spaced-apart stoplight units (plus the upper-center US/DOT-mandated red-stoplight unit). There being essentially two different circuit-systems currently employed on vehicles, one is a combination stop & turn system using a common light-element (herein defined as an electrical transducer of visually radiant energy); —wherein a special circuit-logic "discriminator" senses when the left and right turnlamp-elements activate simultaneously(as stoplights); —thereby equaling a left and right signal, which in modern cars and light-trucks includes a third-eye central brake lamp as well. Alternately, a separate wire-conductor may feed directly from the brake-switch for activation of the center-mounted brakelight.

The alternate circuit-system employs entirely separate lamp-elements for stop & turn, thereby simply eliminating need for a discriminator in the circuit. However it is preferred, particularly for the aftermarket flashback installation-package, that the flashback logic-circuit module include provision for universal adaptation (especially when sold as an aftermarket item) to both these popular vehicular lighting-system circuit modalities; —rather than involve the confusion of producing two different circuit-modules. Note that GM's '96/Corvette has "side-mounted" backup-lamps, which represents one location extreme; while alternately, other cars are noted to have backup-lamps located very close together, such as at both sides of their centrally positioned license-plate.

Note also, that courtesy-lamps on the latest Ford and other make Pick-up trucks, are providing two white courtesy-lamps neatly integrated into the left and right of the high central 3rd/brake-light. These white lamps are normally circuited to illuminate when the door is opened, as to light up the truck interior and illuminate back into the truck-bed. Accordingly, in most any such installation where flashback type enhanced function is attainable (equivalent to recruiting the existing backup-lamps for flashback operation with the stoplights). The only possible restriction of it's implementation being where residual flashback light might glare into the drivers rearview-mirror for example.

In the case of modern motorcars, vans, and pick-up trucks, electrical connection of the flashback circuit-module directly to the hot-wire leading to the DOT/center-stoplight is an obvious procedure; however particularly for aftermarket installation of my invention, gaining access to this specific hot-wire is not always as easily achieved as it would seem. For example, motorcars often employ the DOT/center-stoplight in the rear-window just above the package-shelf; therefore routing a relay-wire from the package-shelf to the back-up lights often isolated within the trunk-compartment is somewhat more involved for aftermarket installations. Accordingly, a special discriminator circuit-logic electrical hook-up is preferably to be included for aftermarket sales-kits, whereby the installer need only merely open the trunk-lid, and locate direct access to both the turnlamps common hot-wire and the stoplight common hot-wire; and merely following the furnished installation instructions, accomplish a quick and easy installation without having to even go forward to the brake-light switch hot-wire(going to the stoplights) for example. Note that an added advantage of the disclosed invention, resides in it's providing a back-up flash of alerting light in the event a vehicle's stoplights were to be malfunctioning.

C.) Another object of this innovative STOPWHITES™/flashback-system is that it preferably also be electrically-circuited to cooperate with the vehicle's existing 4-way/Emergency-flasher system circuit. Here again, the novel advantage of combining a brief, almost strobe-like "glimpse-action" of the incandescent back-up lamps (but more preferably, via use of hi-intensity white-lamps such as: neon, halogen, or instant-on LED/light-emitting diodes(if commercially available in white), with the two regular rear stoplight units acting in unison, resides in a significantly enhanced visual threshold-perception factor. The precipitous sinewave-spike reading generated initially by my STOPWHITES™ flashback-system, in contrast to the basically elongated-sinewave flashing function generated by the existing stoplights, is quite indicative of the resulting near subliminal albeit rather hellaciously eye-catching performance. The initial glimpse-effect being, to cause a vehicle to be recognizable as during braking for example, a greater safe-margin separation distance away, thereby more safely alerting rear-approaching drivers as to a possible emergency situation.

Note also for example, that in a foggy condition, my STOPWHITES™/flashback system operating in conjunction with the existing vehicle 4-Way/Emergency-flasher system (here preferably giving off a fractional-second flash upon each occurrence of the rear pair only of the 4-ways), is capable of providing dramatic reduction in the incidences of pile-ups occurring during fog. When fog shrouds an area, it envelopes everything in a generally muted-greyish vapor. According to internationally accepted standards, horizontal visibility must be restricted to less than one-kilometer (0.6 mile) for suspended particles of moisture to be considered a fog; —otherwise, the obstruction is referred to as haze or mist. Dew and clouds form from the moisture condensed and gathered around microscopic bits of dust forming fog particles. In ultimately dense fog, there may be some 20,000 of these particles per cubic-inch (16 cu.cm.), and even near the ocean there is sufficient dust in the air to support fog formation. Fog cannot form however, until the air is made to give up it's moisture which leaves the air and condenses when the air is cooled in some manner; owing that cool-air cannot hold as much water as warm-air. The haze mixture of smoke and fog found over a city is called "smog", which is generally more intense in larger cities owing to the dust of vehicle-emissions. Significantly, my STOPWHITES™/flashback-system is able to provide an added margin of visual notice to another driver, when observed under adverse fog conditions.

D.) Another objective of my innovative STOPWHITES™/flashback-system is that it optionally be electrically-circuited for cooperative triggering with the vehicle's existing ABS(automatic braking system). This being accomplished simply by way of an electrical interfacing circuit, to include an oscillator wired to the emergency side of the STOPWHITES-circuit; whereby the fractional-second white-light source is caused to rapidly flash continually, preferably until the emergency braking action of the ABS-circuit ceases, or alternatively until a predetermined series of flashes are completed. The reasoning behind this provision being, that a driver of a vehicle not equipped with more efficient ABS-braking, may thereby be alerted to take evasive-action (possibly going off onto the road-shoulder) in order to avoid impacting the rear of the ABS equipped vehicle.

E.) Another object of this invention disclosure is to set forth a special "flashback" safety lighting system, whereby it is desired to employ operation of the STOPWHITES™ flashback function in conjunction with the otherwise conventional rear turn-signal lights, including a turn-switch normally circuited (various switching circuits are employed by OEM's) to operate directionally exclusive (that is, —only a left or a right amber or red light can be blinking at any given time to convey intended directional movement). Ensuing tests by governmental-agencies demonstrate enhanced safety benefits in similarly alerting drivers of cars moving laterally in the same direction. Hence, the STOPWHITES™ concept appears advantageous to lateral notification as well.

In summation, the invention hereof in any and all of it's embodiments is a passive type (that is, requiring no driver education nor apparatus interaction with other vehicles) rear-collision avoidance system for a motor-vehicle. This is roughly analogous to the truly pure reflex-action of one's letting go of a hot pan-handle. The invention disclosure employs a special white-light flashback early-warning impulse, to physiologically arouse a pre-emptive threshold of awareness, advantageously alerting other drivers as to an initial braking, turning, and aftward 4-Way emergency-flasher action.

Moreover, the term "white-light" is used herein to broadly define virtually any source of ostensibly coherent-light emanating preferably untainted from a vehicle's light-bulb element, yet which may be optionally slightly tinted (to maximum of 20% hue-pigmentation of conventional vehicular stop and turn lamps), albeit considered undesirable by the instant inventor hereof, toward red or amber, but not appear tainted into apparently green or blue hues. The intrinsic undesirability of employing tainted white-light in my Stop-White flashback functions, resides in the fact that any artificial tinting of light emanating from the actual primary light-element will inherently result in reduction of the particularly desirable peak candle-power measurable from that source.

III.) DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the Claims section annexed hereto; and accordingly, a better understanding of the invention and the variant uses is intended, by reference to the drawings, which are considered as primarily exemplary and not to be therefore construed as restrictive in nature; wherein:

FIG. 1, is a chart providing graphic comparison for a vehicle stoplight, the broken-line exemplifying sinewave signal-generation energization and desired c.p.-intensity comparison between a conventional vehicle stoplight and flashback signal control system shown via a solid-line, exemplified in accordance with and embodying the present invention;

FIG. 2, is a standard reference-chart graphically showing the relative sensitivity of the human-eye to different colors of the spectrum;

FIG. 3A, is a schematic wiring-diagram exemplifying a popular operating circuit for a conventional prior-art stoplight system incorporating "combination" stop/turn-lamps;

FIG. 3B, is the diagram according to FIG. 3A, however here exemplifying an operating circuit augmented in accordance with embodiment of the present invention;

FIG. 3C, is a companion logic-circuit/flow-chart circuit according to FIG. 3B;

FIG. 4A, is a schematic wiring-diagram exemplifying a popular operating circuit for a conventional prior-art stoplight system incorporating "separate" stop & turn-lamps;

FIG. 4B, is the diagram according to FIG. 4A, however here exemplifying an operating circuit augmented in accordance with embodiment of the present invention;

FIG. 4C, is a companion logic-circuit/flow-chart circuit according to FIG. 4B;

IV.) ITEMIZED NOMENCLATURE REFERENCES

Figure 7:
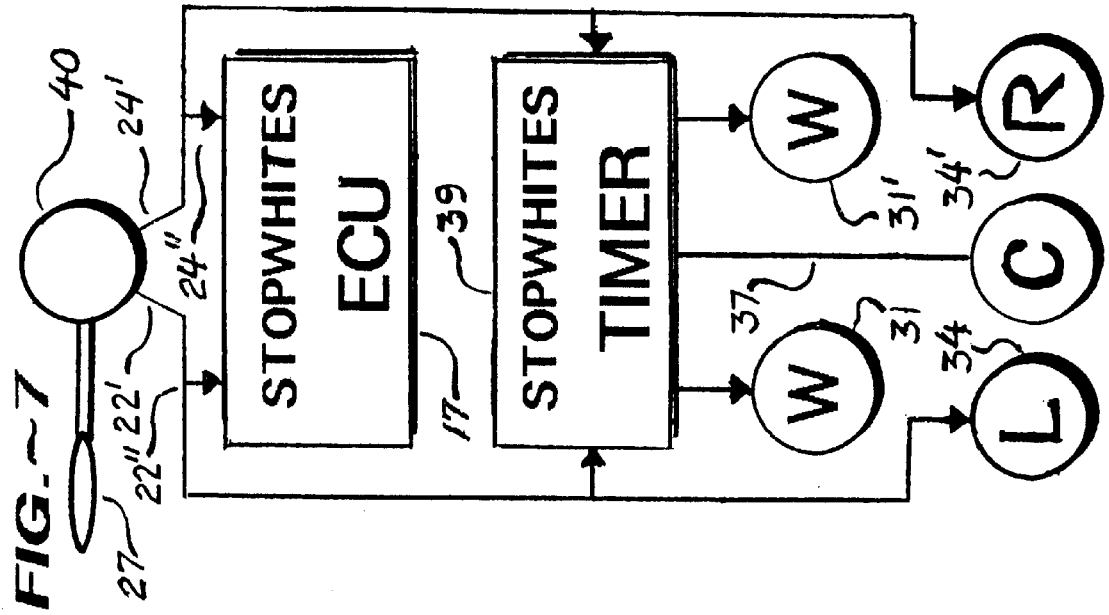
FIG. 7, is a logic-diagram relevant to FIG. 3A, exemplifying an operating circuit arrangement in accordance with the present invention, providing a special "flashback" sequencing effect, enhancing awareness of ordinary turn-signals.

10—strobe like white-light (ideal)
11—incandescent white-light (present)
12—red hue light
13—orange/amber hue light
14—combo. tail/stop compartment
15—discretely compartmented fixture
16—existing back-up switch
17—StopWhites ECU-module
18,18'—existing battery ground-terminal, ECU/ground-wire
19—StopWhites ECU wire to back-up lamps/switch
20—existing stoplight-switch
21,21'—existing FL/turn-switch terminal, FL/feed-wire
22,22',22"—existing RL/turn-switch terminal, RL/feed-wire, RL/ECU feed-wire
23,23'—existing FR/turn-switch terminal, FR/feed-wire
24,24',24"—existing RR/turn-switch terminal, RR/feed-wire, RR/ECU feed-wire
25,25"—existing 4-way flasher terminal, 4-way flasher switch
26,26'—existing turn-switch terminal, stoplight-switch interconnect-wire
27—existing manual turn-switch stalk (L=left X=null R=right)
28—existing manual nighttime road-light switch
29—existing dashboard panel
30—existing key-operated ignition-switch
31,31'—existing backup-light element (left/right)
32/32'—existing taillight element (left/right; of dual-element bulb type)
33/33'—existing stoplight/turnlight element(left/right; of dual-element type)
34/34'—existing rear-turnlight element (left/right; of separate bulb type)
35/35'—existing front-turnlight element (left/right; of separate bulb type)
36—existing hi-central 3rd-eye stoplight
37—StopWhites ECU-timer interconnect to any type centered stoplight
38—existing turn-signal flasher-unit
39—StopWhites ECU-timer
40,40'—StopWhites ECU/stop-terminal, feed-wire
41/41'—existing hot-wires (from battery/from 4-way)
42—existing ABS/ECU
43—ABS/ECU interconnect
44—StopWhites-ECU oscillator

V.) DETAILED DESCRIPTION OF THE PREFERRED EMBODIMENTS

Initial reference is given by way of FIG. 1, wherein is exhibited a chart graphically illustrating the comparative oscilloscope-reading difference between the exemplified white-light action 10 of the preferably strobe like STOP-WHITES™ being set forth in this disclosure, and a more conventional incandescent red-stoplight burn, per dashed-line 12. Note, that if my flashback action were for example to employ a white(clear or translucent)-lens covered incandescent-bulb(as is considered standard automotive OEM for back-up lamps), it's relative operational sequence would appear more as represented via dotted-line 11.

Accordingly, the FIG. 1 chart serves to characterize the distinctive preferably relatively high-intensity, however near instantaneous, preferably rather strobe like attention-getting "flash", which owing to it's rapid-fire action, acts to gain the vital cognizance of a perhaps momentarily distracted or otherwise attentively-lulled immediately following driver. Thus, upon application of a conventional brake-pedal, in addition to normal operation of red(always when activated) stoplights 12 (left & right stoplights, plus the red high center DOT-stoplight), the back-up lamps are briefly activated per either reference-lines 10 or 11. This same manner of function is also preferably provided upon initial illumination of either a left or right turnlight (read 12 into 13), particularly in rear-lighting installations where the two back-up lamps are respectively arranged closely proximal to the two turn-lamps. Additionally, it is preferable that this special so called "flashback" function operate discretely with only a left or a right turn-lamp; —that is for example, a left-turn switch-actuation would sequence a single flashback action of the left back-up lamp only (right back-up lamp remaining off), thereby instantly drawing an adjacent motorist's attention directly to the ensuing left turn-lamp blinking activity. Note also, that some turnlights are integrated with the stoplight lamp-units, in fact some sharing in common the very same bulb-element (ref. FIG. 3A for example); while in other cases, turnlights and stoplights are each housed entirely separately (ref. FIG. 4A); that is, in separate or discrete compartments of a rear-lighting lamp-fixture 15/15'. Also, while stoplights are always red in hue, turnlights are either red or amber in hue; while virtually all back-up lamps are considered colorless (without hue), commonly referred to as white. Various types of white-light transducers can be employed, preferably a commercially available electrically stimulated transducer, capable of radiating energy of a frequency-range facilitated by the human-eye as substantially within the relatively narrow spectrum of so called white-light.

Study of FIG. 2 finds an optical reference chart indicating the ralative wavelength frequency response of the human-eye to natural ambient daylight spectrum stimulus, ranging from approximately 400–700 nanometers in wavelength at most. Observe that the eye's receptor-sensor's are most responsive to substantially white-light 15 indicated (100%) at the very apex of the graph; noting that the eye's responsiveness (visual efficiency) to red-light is just half that (50%) of white-light. Hence, this chart serves to graphically demonstrate how an instantaneous flashback glimpse of so called white-light 11 at the threshold of signaling, will for the purposes of this disclosure, terminate relatively early on. The white flash having served it's sole functional purpose, essentially only that of "alerting", while the substantially less effective red-light 12, or amber(orange)-light 13, necessarily continue on for their full normal (conventional) signaling function sequence (the white-light having no actual signaling function, nor any roadway illumination function). In essence, the brief flashback of white-light 11 only functions to 'grab' a driver's attention; —and once so attained, the red-light 12 or orange-light (amber) 13 signal can thereby more effectively provide the information that a following driver needs to know, —about what's happening ahead or adjacent them. Hence, owing this different human psychophysiological threshold of visual acuity or sensitivity to red vs. white (as shown in FIG. 2), one can perhaps really best comprehend the phenomenon of my Stopwhite-flashback principle, by considering that one's mind's-eye is therefore only just becoming actually cognizant of the red-light coming-on, as the white-light is going-off; —even though both lights really electrically initiate at very the same time! Accordingly, it is thus not necessary, nor desirable, to feed electrical energy to the white-light source of this invention prior to the red-light sources, in order to make the white-light appear more definitive; as it is only a device by which to draw earlier attention to the fact that the driver is doing something either in braking or directionally, which may effect any following or adjacent vehicles.

Hence, while the intent of this disclosure is to teach the unique notion of enhanced safety through adoption of "ultimately early-threshold" alerting via a nearly subliminal glimpse of white-light; and thus, not so much to emphasis any particular type of lighting device or circuit, as required for successful implementation of the flashback principle. It nevertheless is considered prudent herein to give examples of workable systems, so as to thereby demonstrate an exemplary practical functioning form of hardware.

Thus, reference to FIGS. 3A/B shows a fairly typical exemplified "prior-art" electrical-circuit for a vehicle of the type having conventional "combination" or integrated tail-light/stoplight (dual-element bulb) non-compartmented fixtures 14/14'; plus, discrete white backup-lights 31'/31". Note in FIGS. 3A/B(and FIGS. 4A/B), the markings FL/RL With the conductors (wires) extending from turn-switch electrical-contact terminals 21/22 respectively, designates feed-wires to the front-left/rear-left lamps; and accordingly, markings FR/RR with the wires extending from turn-switch electrical-contact terminals 23/24 respectively, designates feed-wires to the front-right/rear-right lamps Study of campanion FIGS. 3B/C shows the preferred method of making an OEM or aftermarket electrical-circuit hook-up incorporating my STOPWHITES™/flashback system. Here, the ECU(electronic control unit) module is represented by appended box-diagram 17, having battery-ground wire 18 in electrical communication with chassis-ground terminal 18', and including wire-conductor 19 arranged in communication with normally pre-existing back-up lamps 31/31' and n.o./switch 16; —feeding positive/electrical-current to back-up lamps 31/31' when brake stoplight-switch 20 becomes closed. The usually now existing third-eye (DOT-mandated for better visibility) high centrally mounted stoplight 36 is shown in FIG. 3C, between the two representative left 33 and right 33' stoplight (elements; which can also function discretely as turnlight elements, or as 4-way lighting elements).

Reference to FIG. 4A, shows a generally typical exemplified "prior-art" electrical-circuit for a vehicle having the otherwise popular conventional "compartmentally separated" 15/15' type of stop, turn, and possibly back-up lamp housing arrangement (generally often contiguously integrated as a lens housing, albeit internally discretely divided via opaquely occluding intercompartmental-walls). Study of companion FIGS. 4B/C show a preferred method of making an electrical-circuit hook-up incorporating my STOPWHITES™/flashback system. On passenger-cars, these discretely compartmentalized rear-lighting housings tend to be arranged in a substantially horizontal manner of orientation; while on commercial-vehicles, such as pickup-trucks and vans, the lighting housings are often arranged more vertically at both extreme R&L rear-sides of the body. Here as well, the ECU(electronic control unit) module is represented by appended box-diagram 17, having grounding-wire 18' in common with battery-ground terminal 18, and including wire-conductor 19 arranged in electrical communication with normally pre-existing back-up lamps 31/31' and no/switch 16; —feeding positive/electrical-current to back-up lamps 31/31' when brake stoplight-switch 20 is closed, causes a StopWhite 31/31' flashback action. On modern vehicles, the usually existing so called "third-eye" (DOT-mandated 3rd-eye for safety) high centrally positioned stoplight 36 is shown in FIG. 4C, juxtaposed between the two representative left 33 and right 33' stoplight elements.

The STOPWHITES™-ECU 17 as adapted in FIGS. 3B/C is preferably the same module unit as provided in FIGS. 4A/B, but "logically" is wired a little differently as can be ascertained upon comparison of FIG. 3B and FIG. 4B. Note that in FIG. 3B, there is no conductor connected to stoplight terminal 40' of the ECU, so as to cause a StopWhites signal to be sent that both left & right stop/turn lights are to come on (which is the very essential purpose of my special dual-purpose StopWhites logic-circuit). The StopWhites logic-circuit serves to pre-emptively detect if both right and left stoplight elements 33/33' are being activated simultaneously, and if so, to send a signal to the StopWhites timer 39 (which circuitively is preferably formed integrally within ECU 17). Hence, the only way to place both stoplights "on" simultaneously is by applying the brakes, thereby closing stoplight switch 20, sending a signal to the vehicle's turn-switch(TS) 27; TS 27 thereupon making the determination that a left or right turn-signal is not in progress. However, upon driver activation of a left or right turn-signal via turn-switch 27, the TS 27 acts to leave one light 33 (for example) on steady, while the transversely opposite companion exemplified stoplight-element 33' becomes a discrete turnlight, commencing to immediately flash in normal turn-signal fashion. The StopWhites ECU logic-circuit having detected a signal from both L&R(left & right) combination (dual-element) lamps 33/33', thus sends a maximum preferred duration of approximately ¼th-second (0.250-millisecond) nighttime (½-second1.500-millisecond max. in daytime) flash pulse of electrical current; while in FIG. 4B, wire 40 is shown in electrical communication with both existing stoplight-switch and stoplights 33/33' (often employing G.E. or Sylvania bulbs #1157 presently).

Figure 5:
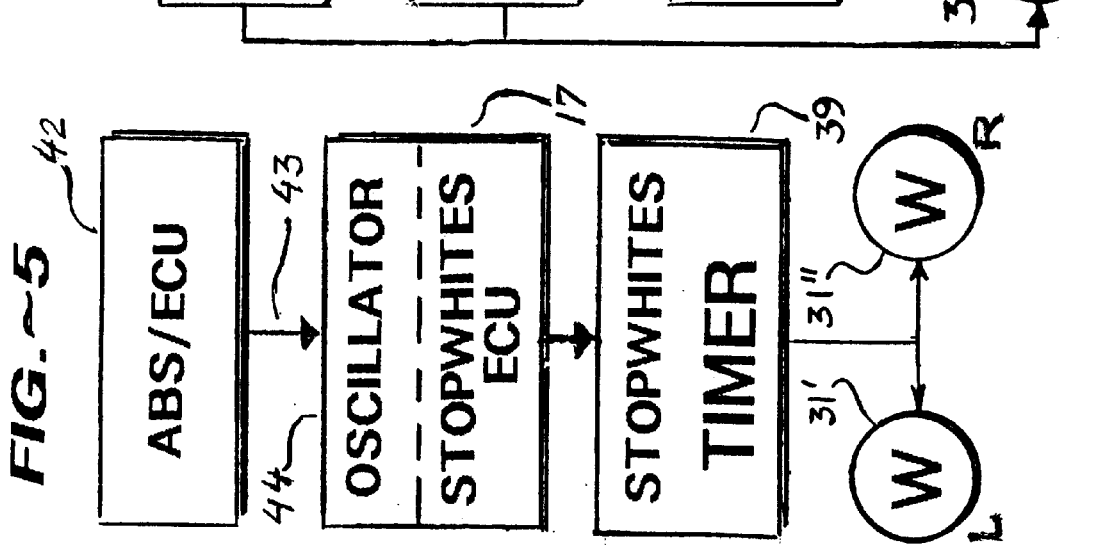
FIG. 5, is a logic-circuit diagram exemplifying the optional combination of the instant invention in cooperation with a conventional ABS/braking-system, tantamount to an interfacing electrical hook-up.

There remain subtle, however vital other differences which are to become herein more evident and understood as important improvements. For example, reference to FIG. 5 shows a logic-circuit for a generic prior-art ABS/braking-system (various well known proprietary versions are commercially available), wherein is shown an electrical communication with my STOPWHITES™/flashback system. Here, it is shown that my ECU-timer 39 is activated by existing ABS/ECU 42 via interconnecting conductor-wire 43; whereby sufficiently heavy application of the brakes to activate the vehicle's ABS/ECU 42, will thus also activate STOPWHITES™/flashback lights 31/31'. The StopWhites timer-section 39 is notified by the StopWhites ECU 17 as the vehicle's ABS/ECU 42 notifies StopWhites ECU oscillator 44 that a panic-stop condition is underway, thereby causing StopWhites lights 31/31' to flash in special rapid-fire fractional-second successions until the driver eases foot-pressure upon the brake-pedal, thereby ending ABS activation. Still other automotive-lighting design-engineers may prefer that the ABS/ECU 42 to StopWhites ECU 17 interconnect 43 be distinctly programmed to usher forth only three fractional-second alerting flashes of white-light for example. Note again, that the exemplified StopWhite lights 31/31' can be existing backup-light elements; or perhaps more preferably, special purpose StopWhite light-elements virtually integrated with the stoplight-housing.

Figure 6:
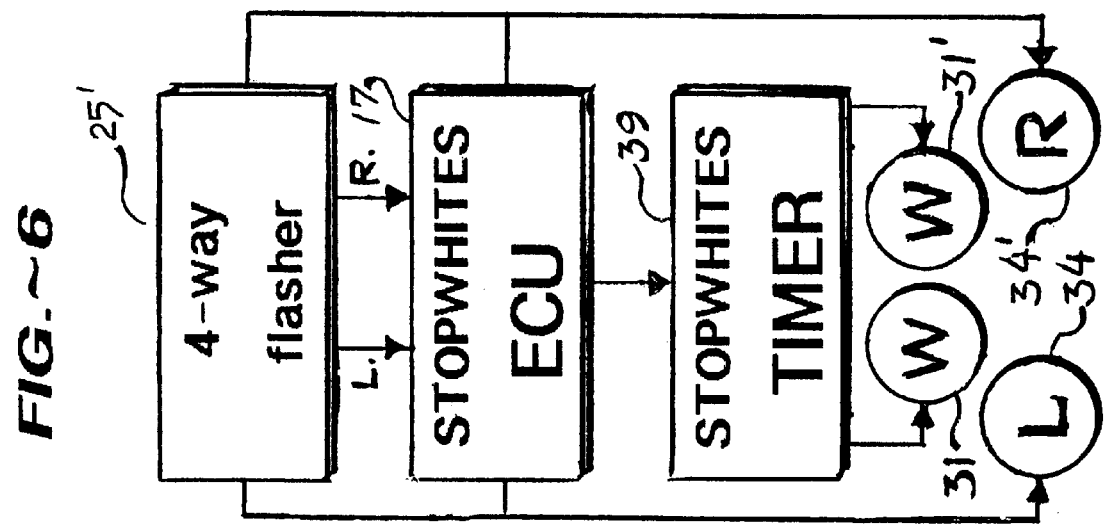
FIG. 6, is a logic-diagram relevant to FIG. 4A, exemplifying an operating circuit arrangement in accordance with the present invention, providing a special "flashback" sequencing effect, thereby enhancing awareness of ordinary 4-way/Emergency-flashers.

Next, the prior-art FIGS. 3A/4A include a fairly typical existing circuit diagram for an ordinary 4-way/emergency-flasher system, which is thus adopted in FIG. 6 in basic logic-circuit format. Again there are two basic existing circuit configurations by which to make the StopWhites 31/31' become flash activated by the StopWhites ECU 17 and timer 39. First being the so-called "combination" type stoplight-element 33/33' circuit arrangement, wherein nothing special in the way of connections is necessary because 4-way flasher switch 25' simply becomes an on and off signal for stoplight-elements 33/33' (somewhat akin to a person pumping the brake-pedal). Whereupon, as both left & right turnlights 34/34' start to come on, the StopWhites ECU logic-circuit simply adds both signals to sequence an "on"-condition, by instantly activating existing 4-way switch 25', the preferred approximate 0.250-millisecond flash pulse of electrical current is issued forth to white-lights 31/31' preferably arranged closely proximal the conventional red or amber spaced-apart rear turn-lamps 34/34'. This commands ECU-timer 39 to initially "flashback" StopWhites 31/31' (existing back-up lamp-elements generally). In the existing combination system, it is an inherently automatic function, requiring no additional safety flashback circuit provision be provided to the existing OEM 4-way flashing circuit. Formerly, the only way to conventionally operate both turn-lamps 34/34' simultaneously is by driver activation of the existing 4-way flasher 25. On an existing lighting-system wherein turnlamps 34/34' and stoplights 33/33' are discretely compartmented in a rear lighting housing, it is necessary to place both turn-lamps 34/34' on simultaneously, so that the StopWhites ECU 17 logic-circuit can instantaneously add (combine) both left & right signals; —sending the resultant discriminator signal to ECU-timer 39, in turn instantly causing StopWhites 31/31' to initially flashback. Note that since the existing R&L rear stoplights 33/33' and turnlights 34/34' can serve the rear 4-way emergency lighting system function, the representative lights indicated L and R are thus here each given dual reference callout numbers.

Next, in FIG. 7, is shown a logic-circuit diagram incorporating a generic operating arrangement for a turn-signal system such as has been exemplified in FIGS. 3B/4B, wherein the mode of operation provides the amber-front 35/35' and amber-rear 34/34' and/or red-rear 33/33' (generally a G.E. or Sylvania bulb type #1157 presently) turn-lamps with a closely proximal ancillary white-light 31/31' function (preferably formed integrally with the otherwise conventional respective R&L turn-lamp housings). The preferred mode of operation is to issue forth only an initial approximate ¼-second (nighttime preferred maximum) STOPWHITES™/flashback impulse upon biasing of turn-switch stalk 27 (FIG. 3B/4B); subsequent turn-signal flashes then continuing on in a normal manner until the turn-switch 25 becomes normally canceled. Therefore, it need be understood, that while current motor-vehicles typically employ stoplights 33/33', and turnlights 34/34', most any present vehicle will be dependent upon use of it's existing backup-lights 31/31' by way of implementing this StopWhites invention disclosure; unless otherwise augmented by the owner through installation of a pair of equivalent auxiliary aftermarket white-lights. Moreover, it is thus within the purview of this disclosure to expect that in the near future, motor-vehicles will be produced in accordance with this invention disclosure, in which ancillary OEM white-light lamps will be included proximal the stoplights, and another pair proximal the turnlights; thereby rendering it unnecessary to continue adopting existing backup-lights (or recent existing OEM truckbed illuminators arranged usually proximal the 3rd-eye stoplight) to perform the Stopwhites function. Hence, it is considered herein primarily by way of convenient demonstration, that backup-lights 31/31' have been expediently adopted as the Stopwhites, since any aftermarket auxiliary or future OEM ancillary white-light light-fixture (preferably arranged very closely proximal the respective stop and turn lights) can provide essentially the equivalent if not more ideal visual effect; and thus, are considered herein tantamount to lights 31/31' (and within the proprietary purview of this invention disclosure; —that being the basic notion of employing a fractional-second flash of ancillary white-light in combination with either stop or turn lights, to better alert a following motorist). Note again here, that since the existing R&L rear stoplights 33/33' and turnlights 34/34' can serve the rear turnlight system function, the representative lights indicated L and R are thus here each given dual reference callout numbers.

The invention premise of this disclosure promises to benefit significantly from current automotive lamp R&D by others, exploring adaptation of neon and other types of white-light devices such as xenon. For example, a new state-of-art GE#LE70/2P light-bulb, employs metal-halide producing an 'arc' in rareified-gas, providing an ideal color-temp. of 4,000 Kel. for 4,000 hrs.; at 4× the electrical efficiency of a modern incandescent halogen light; —which owing to their inherently lower electrical-resistance, illuminate instantly (response time to potential luminance) and conversely die-out instantly! In contrast, present-day incandescent-bulbs rely upon the primitive Edison "short-circuit" technique, requiring a measurably longer 'warm-up' time (to in effect incinerate a tungsten-filament, albeit not destroyed for absence of an oxygen atmosphere).

Thus, it is readily understood how the preferred and generic-variant embodiments of this invention contemplate performing functions in a novel way not heretofore available nor realized. Furthermore, it is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended Claims set out the scope of the invention sought, and are to be construed as broadly as the terminology therein employed permits, reckoning that the invention verily comprehends every use of which it is susceptible. For example, I have illustrated and described my early-warning lighting system in ways I believe currently appropriate, it is not my intention to limit my invention exactly to these embodiments, since appearance and exact location of the lights will even be influenced by the management, stylists, and marketing specialists of the automobile industry. Accordingly, the embodiments of the invention in which an exclusive property or proprietary privilege is claimed, are defined as follows.

What is claimed of proprietary inventive origin is:

1. A rear-collision avoidance lighting flashback system for a motor-vehicle, generating a whitelight flashback early-warning visual phenomenon, psychophysiologically arousing an earlier threshold of awareness passively alerting following drivers as to an initial braking condition; said system comprising a motor-vehicle equipped with:

a commercially available electrically stimulated transducer means capable of radiating energy of a frequency-range facilitated by the human-eye as substantially within the narrow spectrum of so called whitelight;

a conventional driver actuated nighttime road-lighting operating switch;

a pair of conventional right and left/spotlights (R&L/spotlights normally circuited to operate in response to application of the vehicle's brake-pedal;

a pair of conventional rear R&L/turnlights normally circuited to operate directionally exclusive in response to selective actuation of vehicle's turn-signal switch;

an electrical-circuit adaptation means by which to place said transducer means in electrical communication with said motor-vehicle's electrical-circuitry;

an ECU means programed and circuited with vehicle's existing electrical system as to be triggered upon initial application of said stoplights, whereby a timed electrical signal is sent to said transducer means, thereby propagating an intense fractional-second flash of light aftwardly to attract attention of following drivers;

a reactivation-suppression delay-phase of operation, whereby said ECU means is programmed to defeat reactivation of the timed fractional-second signal until brake-pedal action has ceased and subsequently reapplied, said delay-phase thus negating excessive occurrence of said flash events as to thereby maintain spontaneous visual effectiveness of said white-light visual phenomenon.

2. The flashback system according to claim 1, wherein said transducer means comprises a pair of conventional R&L/backup-lights, normally circuited to operate in response to vehicle's transmission being shifted into reverse.

3. The flashback system according to claim 1, wherein said transducer means comprises a pair of lights having relatively high intensity not employed as backup-lights, which are arranged proximal said stoplights.

4. The flashback system according to claim 1, wherein under nighttime conditions the ECU timed fractional-second flash is limited to ¼-second duration, via actuation of said nighttime road-lighting operating switch.

5. The flashback system according to claim 1, wherein under daytime conditions the timed fractional-second flash is limited to ½-second duration.

6. The flashback system according to claim 1, wherein said R&L/stoplights are conventionally circuited to normally activate a DOT-mandated central stoplight.

7. The flashback system according to claim 1, wherein said R&L/turnlights are each provided with a proximally discrete said transducer means operating in a fractional-second manner, whereby only a single said flash event is generated upon initial left or right biasing of said turn-signal switch.

8. The flashback system according to claim 1, wherein said transducer means comprises a pair of lights having relatively high intensity not employed as backup-lights, one of which is arranged discretely proximal both said L&R turnlights.

9. The flashback system according to claim 1, wherein said ECU means includes a further reactivation delay timer means preventing reactivation of said transducer even after said brake action is released and reapplied, thereby not to trigger another said timed electrical signal to said transducer means upon application of said brake pedal until a preprogrammed length of time has occurred; thus still further suppressing excessive occurrence of said flash events.

10. A rear-collision avoidance lighting flashback apparatus for a motor-vehicle, generating a whitelight flashback early-warning visual phenomenon, psychophysiologically arousing an earlier threshold of awareness passively alerting following drivers as to an initial braking condition; said apparatus comprising a motor-vehicle equipped with:

a commercially available electrically stimulated transducer means capable of radiating energy of a frequency-range facilitated by the human-eye as within the narrow spectrum of so called whitelight;

a conventional driver actuated nighttime road-lighting operating switch;

a pair of conventional R&L/stoplights normally circuited to operate in response to application of vehicle's brake-pedal;

a pair of conventional rear R&L/turnlights normally circuited to operate directionally exclusive in response to selective actuation of vehicle's turn-signal switch;

an electrical-circuit adaptation means by which to place said transducer means in electrical communication with said motor-vehicle's electrical-circuitry;

an ECU means programed and circuited with vehicle's existing electrical system as to be triggered upon initial application of said stoplights, whereby a timed electrical signal is sent to said transducer means, thereby propagating an intense fractional-second flash of light aftwardly to attract attention of following drivers;

a reactivation-suppression delay-phase of operation, whereby said ECU means is programmed to defeat activation of the timed fractional-second signal until brake-pedal action has ceased and subsequently reapplied, said delay-phase thus negating excessive occurrence of flash events as to thereby maintain visual spontaneous effectiveness of said white-light visual phenomenon.

11. The flashback apparatus according to claim 10, wherein said transducer means comprises a pair of conventional R&L/backup-lights, normally circuited to operate in response to vehicle's transmission being shifted into reverse.

12. The flashback apparatus according to claim 10, wherein said transducer means comprises a pair of lights having relatively high intensity not employed as backup-lights, said transducer means arranged proximal said stoplights and are activated for a fractional-second manner upon initial actuation of said stoplights.

13. The flashback apparatus according to claim 10, wherein under nighttime conditions the ECU timed fractional-second flash is limited to ¼-second duration, via actuation of said nighttime road-lighting operating switch.

14. The flashback apparatus according to claim 10, wherein under daytime conditions the timed fractional-second flash is limited to ½-second duration.

15. The flashback apparatus according to claim 10, wherein said R&L/stoplights are conventionally circuited to normally activate a DOT-mandated central stoplight.

16. The flashback apparatus according to claim 10, wherein said R&L/turnlights are each provided with a proximal discrete said transducer means operating in a fractional-second manner, whereby only a single said flash event is generated upon initial left or right biasing of said turn-signal switch.

17. The flashback apparatus according to claim 10, wherein said ECU means includes a further reactivation delay timer means preventing reactivation of said transducer means even after said brake action is released and reapplied, thereby not to trigger another said timed electrical signal to said transducer means upon application of said brake-pedal until a preprogrammed length of time has occurred; thus still further suppressing excessive occurrence of said flash events.

18. The flashback system according to claim 10, wherein said transducer means comprises a pair of lights having relatively high intensity not employed as backup-lights, one of which is arranged discretely proximal both said L&R turnlights.

19. A rear-collision avoidance lighting flashback apparatus for a motor-vehicle, generating a whitelight flashback early-warning visual phenomenon, psychophysiologically arousing an earlier threshold of awareness passively alerting following motorists as to an initial braking condition; the apparatus comprising:

a commercially available electrically stimulated transducer means capable of radiating energy of a frequency-range facilitated by the human-eye as substantially within the narrow spectrum of so called whitelight;

a conventional DOT-mandated or other type centered stoplight and associated circuit thereof arranged upon the motor-vehicle in cooperation with at least one said transducer means arranged proximal thereto, so as to effectively propagate said whitelight aftwardly toward following motorists;

an electrical-circuit adaptation means by which to place said transducer means in electrical communication with said motor-vehicle's electrical-circuitry;

an ECU means programed and circuited with vehicle's existing electrical system as to be triggered upon initial application of said stoplight, whereby a timed electrical signal is sent to said transducer means, thereby propagating an intense fractional-second flash of light aftwardly to attract attention of following drivers;

a reactivation-suppression delay-phase of operation, whereby said ECU means is programmed to defeat reactivation of the timed fractional-second signal until brake-pedal action has ceased and subsequently reapplied, said delay-phase thus negating excessive occurrence of flash events as to thereby maintain spontaneous visual effectiveness of said white-light visual phenomenon.

20. The flashback apparatus system according to claim 19, wherein said motor-vehicle is a motorcycle including a conventional directionally exclusive turn-signal control apparatus arranged upon said motorcycle in cooperation with a separate said transducer means arranged proximal both a right and a left turnlight and as to propagate said white-light both laterally and aftwardly.

21. A rear-collision avoidance lighting apparatus for a motor-vehicle, generating a whitelight flashback early-warning visual phenomenon, psychophysiologically arousing an earlier threshold of awareness passively alerting adjacent motorists as to an initial lateral change of vehicle position condition; the apparatus comprising:

a commercially available electrically stimulated transducer means capable of radiating energy of a frequency-range facilitated by the human-eye as within the narrow spectrum of so called whitelight, and arranged as to be most apparently visible substantially aftward of said motor-vehicle;

a conventional directionally exclusive turn-signal control apparatus arranged upon the motor-vehicle in cooperation with a separate said transducer means proximal a right and a left turnlight, as to propagate said whitelight both laterally and aftwardly;

an electrical-circuit adaptation means by which to place said transducer means in electrical communication with said motor-vehicle's turnlight circuitry;

an ECU included within said electrical-circuit means providing timing means upon initial activation of said control apparatus, limiting duration of a flashback action to a single fractional-second flash upon initial activation of said turnlight, thereby maintaining spontaneous visual effectiveness.

22. A collision avoidance apparatus for a motor-vehicle, employing a white-light flashback early-warning impulse psychophysiologically arousing an earlier threshold of awareness passively alerting rear approaching motorists as to a road-emergency situation; the apparatus comprising:

a commercially available electrically stimulated transducer means capable of radiating energy of a frequency-range facilitated by the human-eye as within the narrow spectrum of so called whitelight, and arranged as to be most apparently visible in horizontal azimuth directions;

a pair of conventional rear R&L turnlights, including electrical-circuit means adaptation to motor-vehicle's existing 4-way/emergency-flasher circuitry, facilitating simultaneous communication with said transducer means;

an ECU included within said electrical-circuit adaption providing timing means upon initial activation of rear pair of 4-way lights, thereby limiting duration of a flashback action to a single fractional-second flash event upon each normal full-blink activation of said rear lights.

* * * * *